United States Patent [19]

Tse

[11] Patent Number: 5,742,754

[45] Date of Patent: Apr. 21, 1998

[54] SOFTWARE TESTING APPARATUS AND METHOD

[75] Inventor: Anna Y. Tse, Sunnyvale, Calif.

[73] Assignee: Sun Microsystems, Inc., Mountain View, Calif.

[21] Appl. No.: 610,832

[22] Filed: Mar. 5, 1996

[51] Int. Cl.$^6$ .................................................. G06F 11/00
[52] U.S. Cl. ..................... 395/183.14; 395/183.21; 364/267.91; 364/275.5
[58] Field of Search .................. 395/183.14, 182.02, 395/182.16, 183.07, 183.22, 700, 183.21; 364/267.91, 275.5, 267

[56] References Cited

U.S. PATENT DOCUMENTS

| | | | |
|---|---|---|---|
| 4,695,946 | 9/1987 | Andreasen et al. | 364/200 |
| 5,006,976 | 4/1991 | Jundt | 364/184 |
| 5,155,847 | 10/1992 | Kirouac et al. | 395/600 |
| 5,157,782 | 10/1992 | Tuttle et al. | 395/575 |
| 5,276,863 | 1/1994 | Heider | 395/575 |
| 5,410,681 | 4/1995 | Jessen et al. | 395/500 |
| 5,421,009 | 5/1995 | Platt | 395/600 |
| 5,513,315 | 4/1996 | Tierney et al. | 395/183.13 |

*Primary Examiner*—Robert W. Beausoliel, Jr.
*Assistant Examiner*—Dieu-Minh Le
*Attorney, Agent, or Firm*—Hickman Beyer & Weaver

[57] ABSTRACT

The present invention discloses a computer-implemented method for testing a software product using a server computer system and a plurality of servant computer systems which are networked together. The method includes the step of providing the server computer system with the software product to be tested and an associated test suite. The test suite being designed to exercise the software product and generate a test suite log indicative of test results obtained from executing the test suite. The server computer system then transmits the software product and the test suite to user-defined servant computer systems such that the software product and test suite is executed on each of the user-defined servant computer systems. A test suite log is then generated on each of the selected servant computer systems and transmitted back to the server computer system.

32 Claims, 9 Drawing Sheets

SOFTWARE TESTING APPARATUS AND METHOD

BACKGROUND OF THE INVENTION

The present invention relates generally to software testing and verification. More particularly, the invention relates to methods and apparatuses for automatically testing software products on a multiplicity of servant computer systems having different hardware configurations.

A critical aspect of software development is testing whether a particular software product functions as intended and without encountering errors (i.e., bugs). In today's competitive software environment, software customers are increasingly demanding error free software products, and software developers have responded by initiating testing strategies designed to ferret out programming errors. This strategy typically involves repetitively testing their software products on many hardware configurations. By way of example, to properly test a new operating system, the operating system may have to be tested on a variety of computers having differing processor speeds, memory capacities and architectures.

Although repetitive testing is highly successful, it is also extremely time consuming and costly. In addition, as software products become more involved and complex, the testing processes necessary to repetitively test may become prohibitively time consuming.

FIG. 1 is a simplified flowchart illustrating some of the conventional steps involved in testing software products on a single computer hardware configuration. Therefore, it should be understood that the following process may have to be repeated on additional computer configurations to insure comprehensive testing. In step 10, a user identifies a software product for testing and provides it to a test engineer. A software product may be any type of source code instructions or compiled binary instructions. By way of example, representative software products include computer operating systems, application programs, utility programs, device drivers, etc. From step 10, the method proceeds to step 12 where the test engineer determines whether test coverage is desired. Test coverage build involves the compiling of source code instructions and building identifiable binary packets so that a test engineer can take the compiled source code in order to complete the testing routines. Test coverage testing is well known to those skilled in the art, and suitable third party test coverage software may be obtained from many well known software developers.

Test coverage build is different from normal build processes that essentially convert the entire source code instructions into computer readable binary instructions. The difference is that the test coverage build process allows test engineers to identify regions of the source code for special consideration. Once test coverage build is completed, the test engineer may scrutinize the structure of the software product with reference to the identified test coverage regions. Therefore, if the user desires test coverage testing in step 12, the method proceeds to step 14 where a test coverage build is performed. On the other hand, if the user does not desire test coverage testing, the provided software product will undergo a normal product build (i.e., simple compiling) if the software product was provided un-compiled.

From step 16 or step 14, the method proceeds to step 18 where a test suite is provided for product verification. In general, a test suite is a comprehensive list of data files having commands specifically programmed to initiate a number of functional aspects of the software product being tested. For example, if the software product being tested is a word processing program, the test suite may activate a spell check command, a cut text command, a paste command, etc. Therefore, once the test suite is executed, the test engineer may examine whether any of the tested commands failed to operate as intended.

In step 20, the normal product build (i.e., binary instructions) is loaded onto a user-selected test computer system. However, if test coverage was desired in step 12, the test coverage build would then be loaded onto the user-selected test computer system. After the normal product build has been loaded onto the computer system, the method proceeds to step 22 where the test suite provided in step 18 is executed. After the test suite has been executed on the computer system, a test suite log is generated identifying the pass and fail rate of the software product being tested. On the other hand, if test coverage was desired in step 12, then a test coverage data file will be generated indicating the exercised regions of software product code.

Once a test suite log or test coverage data file is generated in step 22, the method proceeds to step 24 where a test engineer analyzes the generated outputs. After the outputs are analyzed, the test engineer produces a verification report. The verification report is typically a translation of what it means to pass or fail for the particular software product being tested. At this point, the process of testing a software product on a single computer system ends.

It is important to appreciate that software testing frequently requires both test coverage testing and non-test coverage testing to assure comprehensive testing. Therefore, if both are required, the entire testing process must be performed for each. Consequently, both test coverage testing and non-test coverage testing must be performed for each computer system used in the testing process. In addition, some software products may have to be tested on the same machine using different operating systems (i.e., if the software product being tested is an application program). As can be appreciated, a large amount of time and money is expended performing the aforementioned repetitive testing steps.

Of course, the testing process generally includes many test engineers or personnel exchanging and processing test data between workstations, floppy disks, and E-mails. By way of example, some testing environments employ test personnel such as product managers, test development engineers, performance engineers, test suite execution engineers, and test data analysis engineers. These people are typically involved at various stages of the testing process, and may be located at remote locations from each other. Consequently, during the testing process, test data may be exchanged between many people and possibly exposing the test data to errors which are wholly unrelated to the software product itself. In such cases, it is frequently impossible or extremely time consuming to trace back and identify which step of the process introduced the error. In some cases, errors that are inadvertently introduced are erroneously attributed to the software product.

In view of the foregoing, there is a need for an efficient method and apparatus for automatically testing software products on a number of computer hardware configurations and reducing the amount of repetitive human interaction.

SUMMARY OF THE INVENTION

To achieve the foregoing, one embodiment of the present invention provides a software testing apparatus including a server computer system being networked to a multiplicity of servant computer systems. The server computer system may also be connected to a product build (i.e. product compiling) computer system. The product build computer system may be a separate computer system that is networked to the server computer system and the multiplicity of servant computer systems. In another embodiment, the present invention provides an option of performing test coverage build, normal build or a combination thereof on the multiplicity of servant computer systems. As a result, the present invention accomplishes the entire software testing process in a more timely and cost effective manner such that the probability of introducing human errors that may be wholly unrelated to the software product being tested is substantially reduced.

In another embodiment, the present invention discloses a computer-implemented method for testing a software product using a server computer system and a plurality of servant computer systems which are networked together. In this embodiment, the servant computer systems define a plurality of different hardware configurations. The method includes the step of providing the server computer system with the software product to be tested and a test suite. The test suite being designed to exercise the software product and generate a test suite log indicative of test results obtained from executing the test suite. The server computer system then transmits the software product and the test suite to selected servant computer systems wherein the software product and test suite is executed on each of the plurality of selected servant computer systems. Then, a test suite log is generated on each of the selected servant computer systems and transmitted back to the server computer system.

In yet another embodiment, if it is determined that a test coverage flag is set, a test coverage build is transmitted to selected servant computer systems such that the servant computer systems execute the test coverage build and generate a test coverage data file that is transmitted back to the server computer system.

DEATAILED DESCRIPTION OF THE PREFERRED EMBODIMENTS

Figure 1:
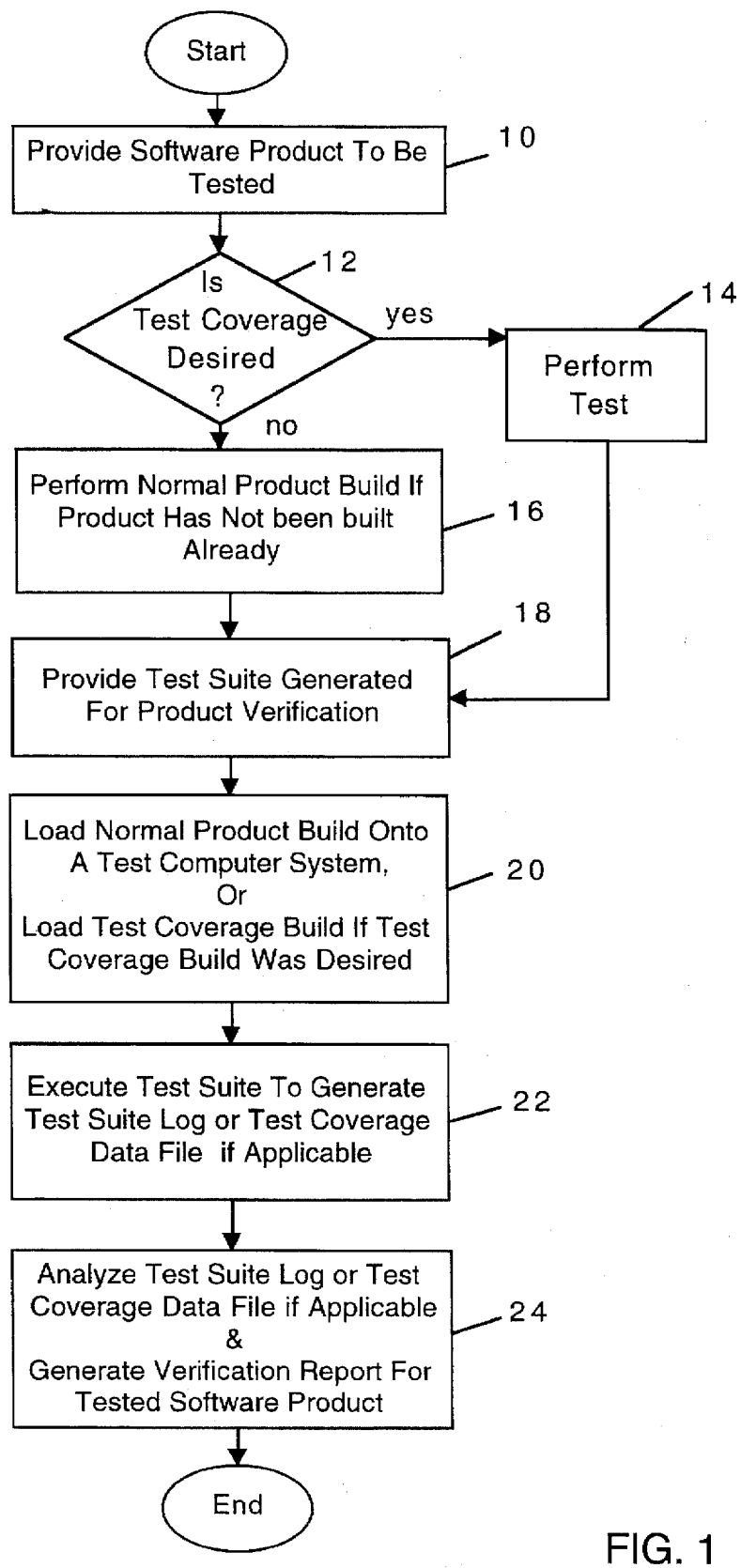
FIG. 1 is a flowchart illustrating the steps associated with testing software products in accordance with conventional methods.

As described above, FIG. 1 illustrated the steps involved in conventionally testing software products on a single computer configuration. As can be appreciated, the conventional testing process may be very time consuming, repetitive and costly. In one embodiment, the present invention discloses an automated software testing process that reduces the amount of human interaction and simultaneously tests software products on a multiplicity of computer hardware configurations. In this embodiment, a testing apparatus consists of a server computer system being networked to a multiplicity of servant computer systems. The server computer system is also connected to a product build (i.e. product compiling) computer system. In addition, the present invention provides an option of performing test coverage build, normal build or a combination thereof on the multiplicity of servant computer systems. Consequently, the present invention accomplishes the entire software testing process in a more timely and cost effective manner without introducing human errors that may be wholly unrelated to the software product being tested.

Figure 2:
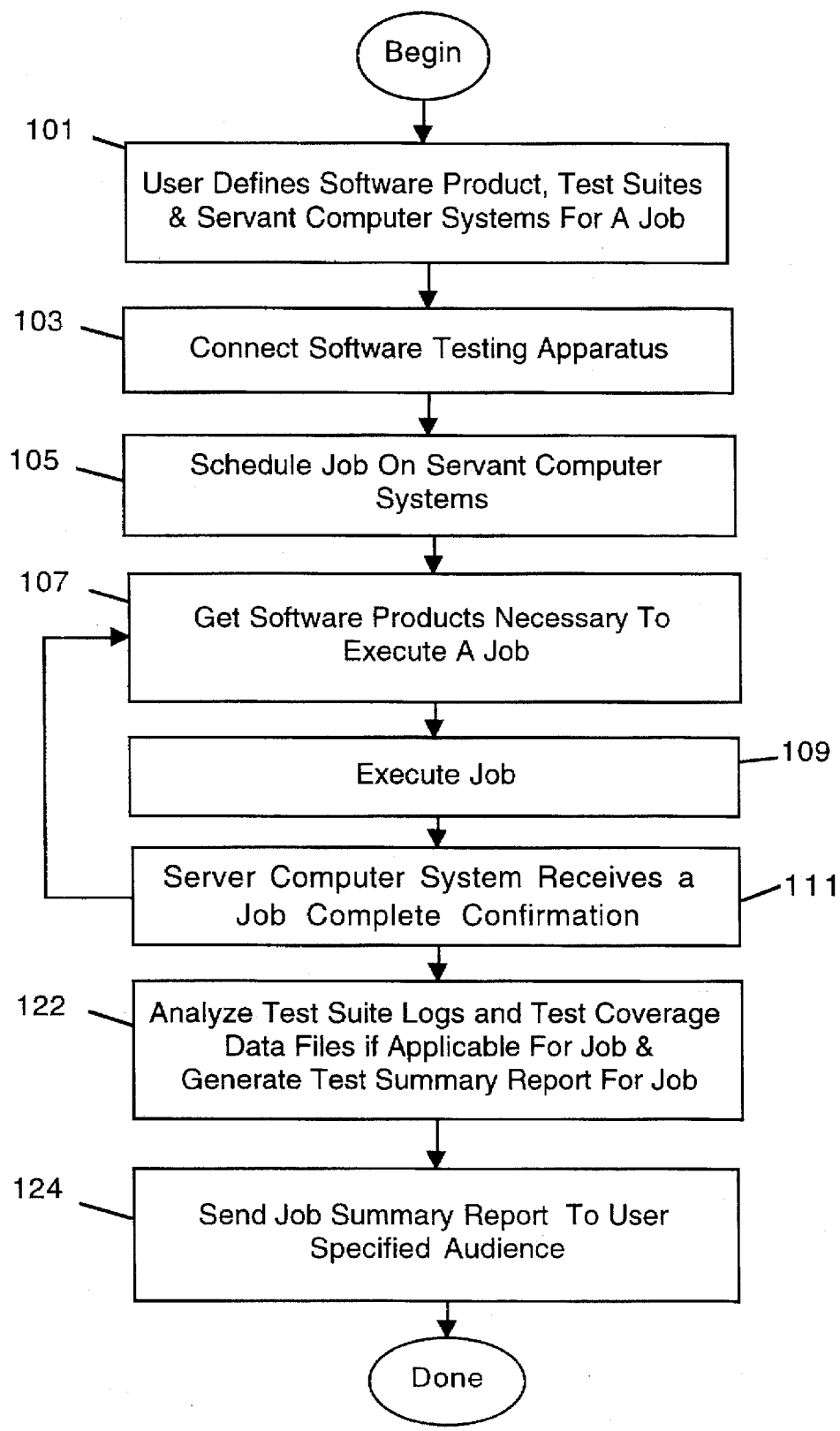
FIG. 2 is an overview flowchart illustrating the steps associated with testing software products in accordance with one embodiment of the present invention.

FIGS. 2 through 9 will now be used to illustrate the steps associated with testing software products in accordance one embodiment of present invention. FIG. 2 is an overview of the process steps associated with testing a user-defined software product, and will be described in greater detail in FIGS. 3 through 7. The overview process begins at step 101 where the user defines a software product for testing, a proper test suite, and a plurality of different computer hardware configurations for a software testing "job." The software product being tested may be any user provided software product. By way of example, the software product may include an operating system, an application program, a data base program, a communication program, an internet program, a user interface program, etc.

As is well known in the art, test suites are generally developed as unique sets of comprehensive data files having commands specifically programmed to initiate functional aspects of a software product during testing. Consequently, most test suites are uniquely designed for specific software products. Thus, when test suites are executed during the testing process, errors specific to the software product under test may be uncovered.

For a particular job, the user may define a plurality of servant computer systems having different hardware configurations. Alternatively, the user may select a plurality of servant computer systems having identical hardware configurations. In any event, the plurality of computer systems may be connected in any suitable arrangement. By way of example, the plurality of servant computer systems may be connected in parallel with respect to the server computer system. Further, the server computer system may also be connected to a product build computer system. The product build computer system is generally used to compile the software product being tested before it is down loaded as binary instructions onto a servant computer system. However, it should be understood that the compiling step may also be performed on either the server computer system, the servant computer systems or a combination thereof.

From step 101, the method proceeds to step 103 where the software testing apparatus having the aforementioned servant computer systems, server computer system, and product build computer system is properly inter-connected. By way of example, a conventional wired local area network may serve as the appropriate physical communication lines.

Once the software testing apparatus is properly interconnected, the method proceeds to step 105 where the server computer system schedules the testing job on the servant computer systems. The scheduling step enables the server to determine whether the user-selected servant computer systems are available for the current testing job.

Once the pre-selected servant computer systems are available for testing, the method proceeds to step 107 where the software products necessary to execute the job are obtained. As described above, the user initially defines the software products to be tested as well as the servant computer system configurations for carrying out the testing process. Therefore, the server computer system will have the necessary information to obtain the software products for executing the job. In another embodiment, the software products being tested may also include software product patches which are necessary for testing. As is well known in the art, software product patches are source code blocks used to fix known errors in the software product.

Once the software products are obtained for executing a particular job on one servant computer system, the method will proceed to step 109 where the job is executed on that servant computer system. As another scheduled servant computer system becomes available, the job will then be executed on that servant computer system. Therefore, each of the servant computer systems are able to simultaneously process jobs (i.e., in parallel). As will be described in greater detail below, a job is executed by running the user-defined test suite on the software product provided for testing. The test results are then generated as either test suite logs, test coverage data files or both. Once the software product has been tested on a user-defined servant computer system, the method proceeds to step 111 where the server computer system receives a job complete confirmation from the user-defined servant computer system. If there are any other jobs in queue for the available servant computer system, the method will revert back to step 107 where the software products necessary to execute the job are obtained.

The method then proceeds to step 122 where the server computer system takes the test suite logs and test coverage data fries (if applicable) and analyzed the results received from each servant computer system in accordance with user-defined definitions. As described above, the results from executing a user-defined test suite are generally produced as test suite logs identifying whether each executable command has passed or failed. Similarly, if test coverage analysis was requested by the user, a test coverage data file would be generated to indicate the exercised portions of code.

In step 124, a summary report is used to translate pass indicators, fail indicators and coverage data received from all user-defined servant computer systems and to allow the presentation of a report organized in a user-defined format. The summary report may then be sent to a user-specified audience. For example, the user may identify any number of people or computer terminals as the user-specified audience. By way of example, the test summary report may be sent to product managers, test engineers, or company officials. At this point, the software testing apparatus is ready to receive instructions for performing another software testing job.

Figure 3:
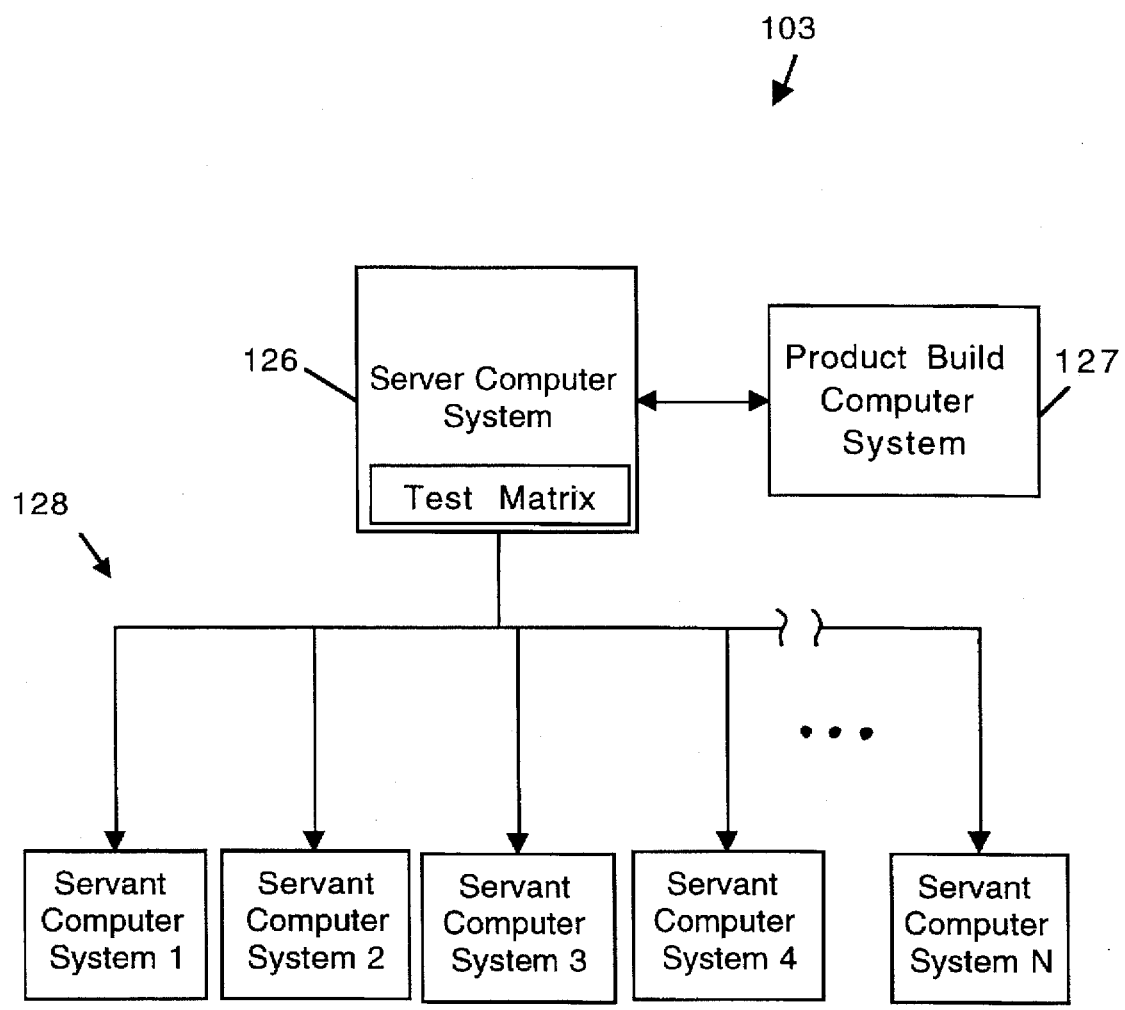
FIG. 3 illustrates a hardware interconnection and process flow associated with testing software products in accordance with one embodiment of the present invention.

FIG. 3 illustrates one possible hardware interconnection scheme for testing software in accordance with one preferred embodiment of the present invention. As described above, the user is prompted to provide in a test matrix the type and location of each servant computer system, the software product being tested and test suites for each of the servant computer systems.

The test matrix information is then input into a server computer system 126 in any suitable manner. By way of example, the information may be input by E-mail, floppy disk, over the internet, over a local area network (LAN), over a wide area network (WAN) or the like. In one embodiment, the server computer system 126 is treated as a control terminal from which testing of the software product is accomplished. Thus, although the server computer system is shown closely connected to the servant computer systems, the server computer system may be located at a location that is remote from the servant computer systems altogether.

Connected to server computer system 126 is a product build computer system 127. In this embodiment, the product build computer system is used to compile the software product being tested. The compiled software product is then sent to the servant computer systems in binary form. As will be described in greater detail below, the product build computer system may alternatively be used to perform test coverage. The product build computer system is generally employed to speed up the testing process, however, product build may alternatively be performed on server computer system 126 or at each of the servant computer systems networked to server computer system 126.

As described above, server computer system 126 is networked to a plurality of user-defined servant computer systems 128. By way of example, the plurality of servant computer systems may include a number of different makes of Sun Microsystems, Inc. computer systems such as a SPARC, SS2-CG6 (8 bit), a SPARC SS2-CG3 (1152×900, 8 bit), a SPARC SS10BSX (CG14, SX), a SPARC SS2-TurboGX, or a number of IBM PC's (or compatibles), or a number of Apple Computer PowerPC's (or compatibles), or a combination thereof.

Figure 4:
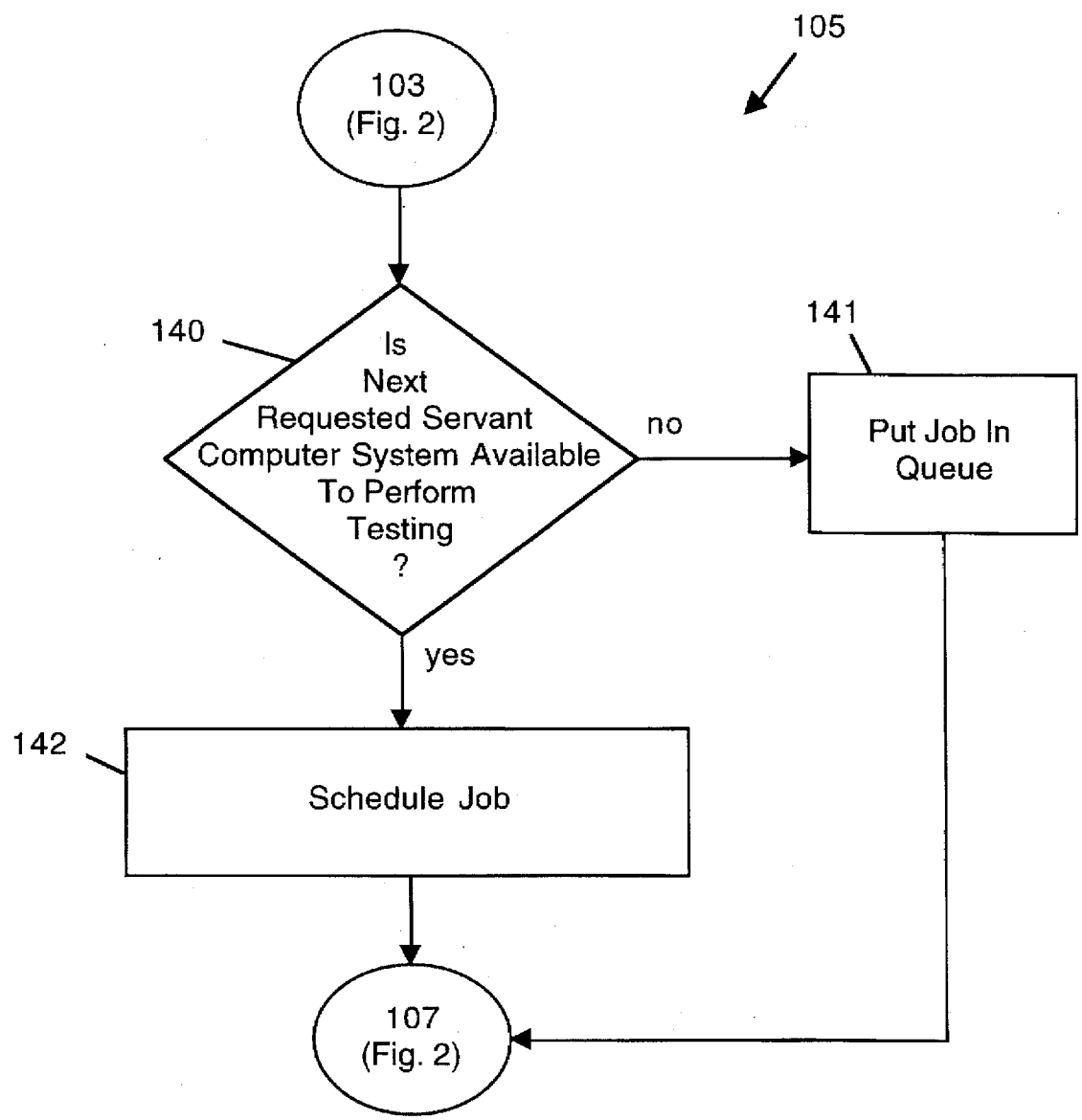
FIG. 4 shows process steps associated with scheduling jobs on the plurality of servant computer systems in accordance with one embodiment of the present invention.

After the software testing apparatus has been properly networked, the method proceed to FIG. 4 where step 105 of FIG. 2 is described in greater detail. In step 140, it is determined whether the next requested servant computer system is available to perform testing for a particular job. Because the software testing apparatus is able to process multiple jobs simultaneously, some of the user-selected servant computer systems may be busy and therefore not available for testing. Therefore, if the next requested servant computer system is not available, the method proceeds to step 141 where the servant computer system request is put in a queue. On the other hand, if the next requested servant computer system is presently available for testing, the method proceeds to step 142 where the servant computer system requested is scheduled for the current job.

Figure 5A:
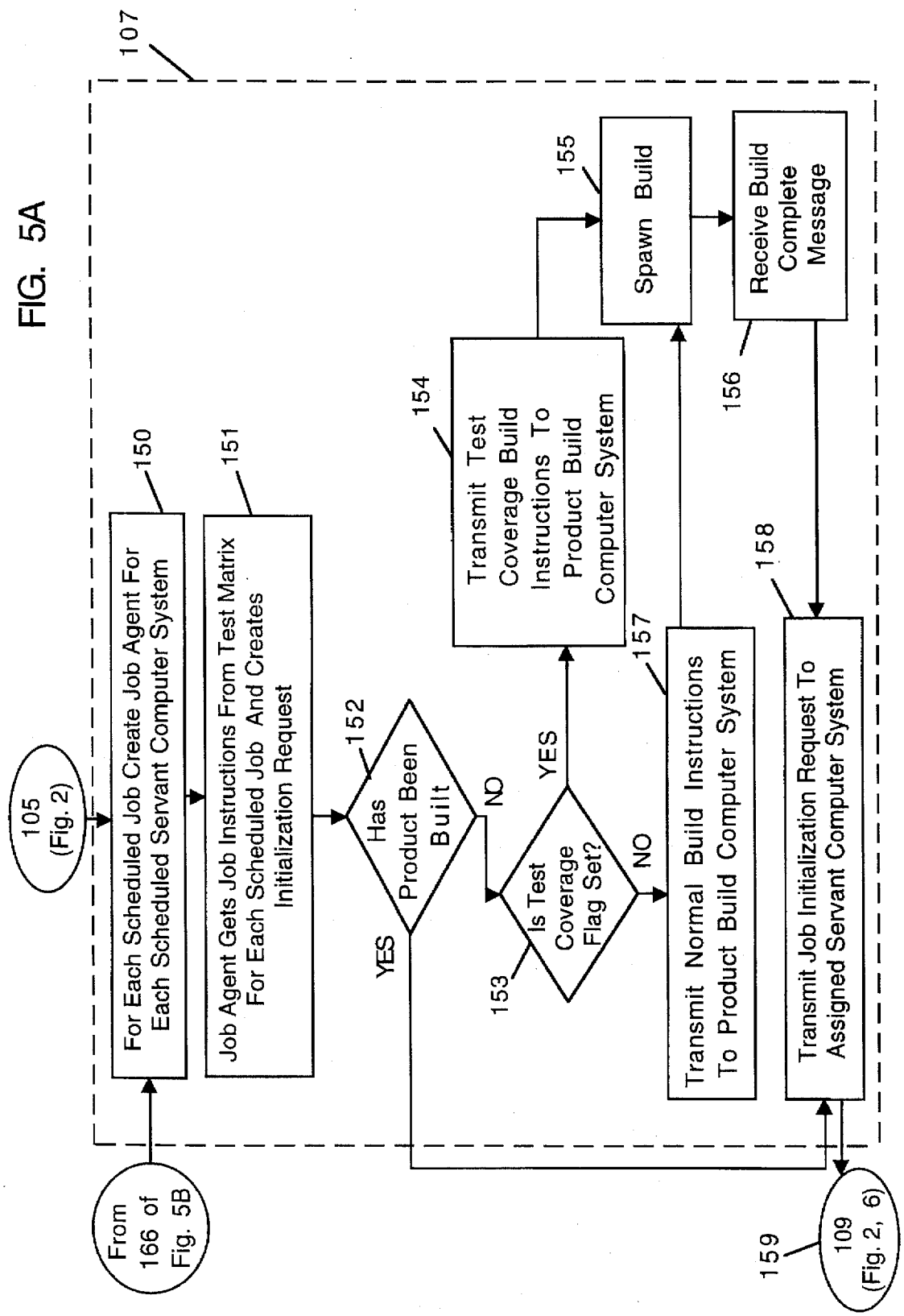
FIG. 5A and 5B illustrate process steps associated with obtaining software product testing job instructions, building the software product, and executing the job at each servant computer system in accordance with one embodiment of the present invention.

The method then proceeds to FIG. 5A where steps 107 and 111 of FIG. 2 are described in greater detail. The process of obtaining the user specified software products for a particular job begins at step 150 where a job agent is created for each job scheduled on each of the servant computer systems. The job agent is essentially responsible for referring to the user-defined test matrix and retrieving the user specified parameters for a particular job. By way of example, the job agent may retrieve the user specified software product and associated software product patches for a particular job.

In step 151 the job agent gets the job instructions from the user-defined test matrix for each scheduled job, and also creates an initialization request. In one embodiment, the initialization request is designed contain all the information a servant computer system may need in order to properly execute the testing procedure. By way of example, the initialization request may contain: (a) the location and hardware configuration of each servant computer system, (b) whether the software product is an operating system or any other form of software program, (c) whether the software product has already been built or must be built, (d) whether test coverage testing is requested, etc.

The method then proceeds to step 152 where it is determined whether the software product provided by the user has been built. As is well known to those skilled in the art, building a product generally entails compiling source code instructions and transforming them into machine-readable binary instructions. Thus, if it is determined in step 152 that the software product provided by the user has already been built (i.e., the software product was provided as binary instructions), the method will proceed to step 158 where the initialization request containing all the information required for testing is transmitted to one of the scheduled servant computer systems.

On the other handuser has s determined that the software product provided by the user has not been built, the method will proceed to step 153 where it is determined whether a test coverage flag has been set. As mentioned above, the user may be prompted to specify in the test matrix whether test coverage testing is desired. If test coverage testing is desired, a test coverage build operation is performed. Test coverage build operations generally consists of compiling source code instructions into identifiable binary packets. In general, performing a test coverage build allows a test engineer to ascertain the structure of the software product with respect to those exercised regions.

Thus, if the test coverage flag was set in step 153, the method will proceed to step 154 where test coverage build instructions are transmitted to the product build computer system illustrated in step 127 of FIG. 3. Once the product build computer system receives the instructions, the method proceeds to step 155 where the test coverage build process is spawned. In other words, the software product being tested is now converted from source code to compiled binary code. As is well known in the art, there are many of suitable software programs available for performing a test coverage build operation. By way of example, one suitable software product is Q.C. Coverage Software by Centerline Software, Inc. of Mountain View, Calif.

After spawning the test coverage build in step 155, the method proceeds to step 156 where the server computer system receives a build complete message. The build complete message also lets the server computer system know the address of the built software product. The method then proceeds to step 158 where the job initialization request is transmitted to the assigned servant computer system. On the other hand, if the test coverage flag was not set in step 153, a normal product build instruction is transmitted to the product build computer system in step 157. Contrasted with test coverage build, a normal product build operates to compile the source code software product into computer-readable binary code without using special test coverage software programs. Therefore, in normal build operations, the user does not identify source code for special analysis.

Once the normal build instructions are transmitted to the product build computer system, the method proceeds to step 155 where the product build computer system spawns the normal build operation in step 155. Then, the method proceeds to step 156 where a build complete message is received and transmitted to the server computer system. The method then proceeds to step 158 where the job initialization request is transmitted to the assigned servant computer system. After the job initialization request has been transmitted to the servant computer system, the method proceeds to step 159 where the job is executed at the servant computer system identified in the initialization request. The job execution of step 159 which is performed on the servant computer systems will be describe in greater detail in FIG. 6.

The method then reverts back to the server computer system where steps 160 through 166 further describe step 111 of FIG. 2. Once the job is executed in step 159, the server computer system receives a job complete confirmation and test suite log associated with the tested software product in step 160. However, if the test coverage flag was set in step 153, a test coverage data fie is received by the server computer system identifying the test results from the test coverage testing. Test coverage data files and test suite logs may display in any suitable manner selected by the user. By way of example, one suitable manner of identifying software product test results may be to assign a pass or fail to certain executed software product commands or functions. Of course, the user may then provide definitions for what it means to pass or fail. Alternatively, the user may choose to receive the results as an un-translated pass or fail test suite log, test coverage data file or both.

In some instances, software developers may choose to only receive overall software product performance by not setting the test coverage flag in step 153 for one servant computer system. However, the user may then set the test coverage flag in step 153 for another servant computer system that was scheduled for the same job. As can be appreciated, the user may perform both test coverage testing and non-test coverage testing on two servant computer systems scheduled for the same software product testing job. Alternatively, the user may select to perform test coverage on all of the servant computer systems scheduled for a particular job. In addition, as mentioned above, each of the servant computer systems may have different hardware configurations (i.e., different random access memory (RAM) capacity, different processor speed, etc.). Alternatively, each servant computer system may have the same hardware configuration.

From step 160, the method branches of to step 161 and 164. Referring first to step 161, here it is determined whether all of the servant computer systems have completed processing for a particular job. If all of the servant computer systems scheduled for a particular job have not completed processing, the server computer system will wait until a job complete confirmation is received from each of the servant computer systems defined in the test matrix for particular job.

On the other hand, if it is determined in step 161 that each of the servant computer systems have completed processing for a particular job, the method will proceed to step 122 of FIG. 2 where any test suite logs and test coverage data files associated with the current job are analyzed. At this point, all of the processing has been completed for the current job. However, even though a job complete confirmation is received from all servant computer systems for the current job, the testing process may still continue for any other jobs scheduled on the server computer system (i.e., a new job defining another software product to be tested). Therefore, the method may proceed to step 162 where the server is informed of a job completion for a particular servant computer system of the new job.

On the other hand, if all of the servant computer systems have not completed processing for the current job, the method will proceed to step 164 where it is determined whether there are any jobs in queue for an available servant computer system. As mentioned above, there may be many jobs scheduled to be executed on a particular servant computer system. By way of example, the current job may be the "nth" job in the queue, and the particular servant computer system selected for the current job may be busy working on other jobs.

Therefore, if it is determined that there are no jobs in queue for an available servant computer system, the process will proceed to step 165 where the servant computer system is marked as available for the next job. If it is determined that there are jobs in queue for an available servant computer system, the method will proceed to step 166 where the next job is scheduled. The method will therefore proceed through the aforementioned steps until there are no more jobs in queue for an available servant computer system, and all servant computer systems have completed processing for all of the scheduled job.

Figure 5B:
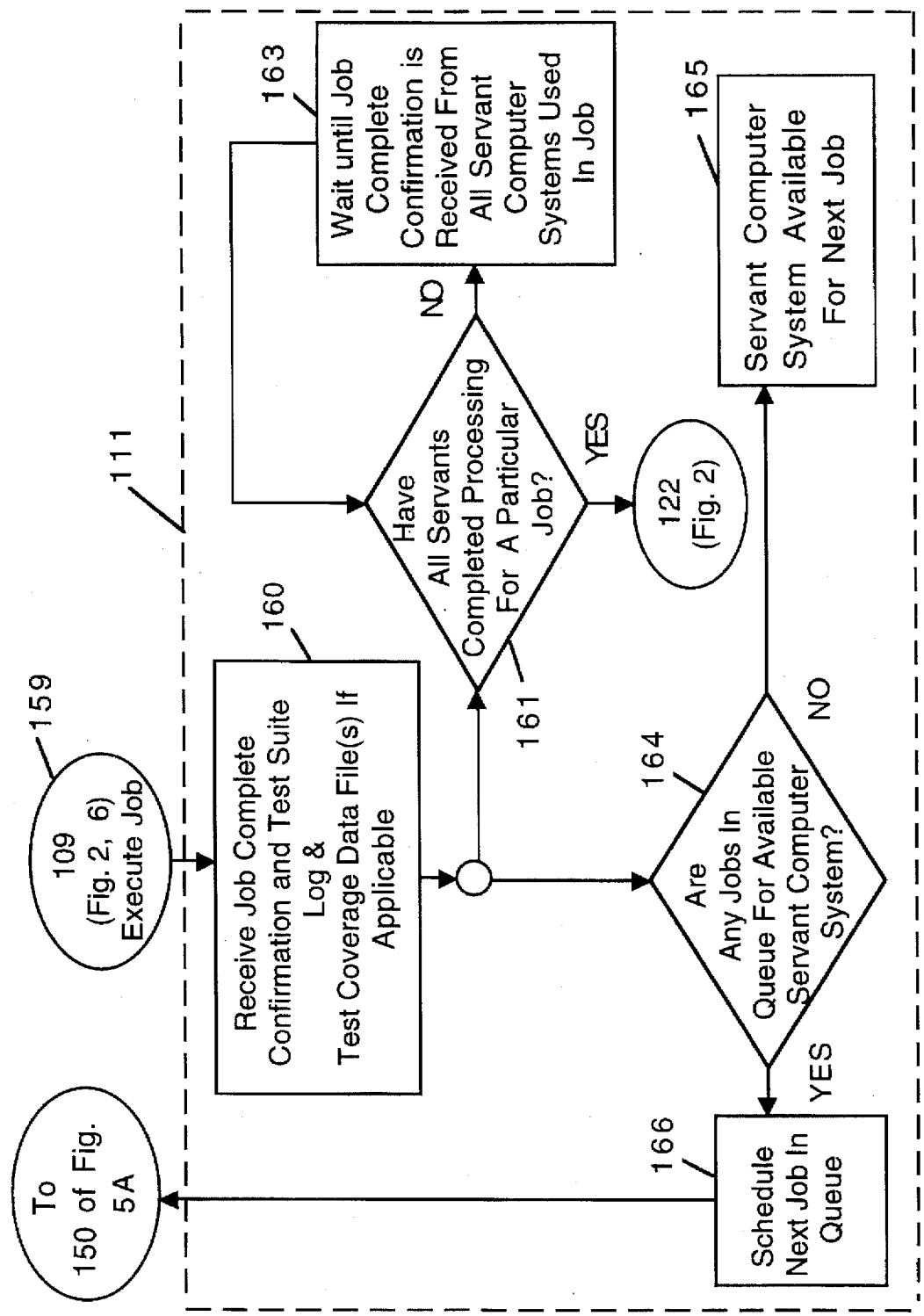
Figure 6:
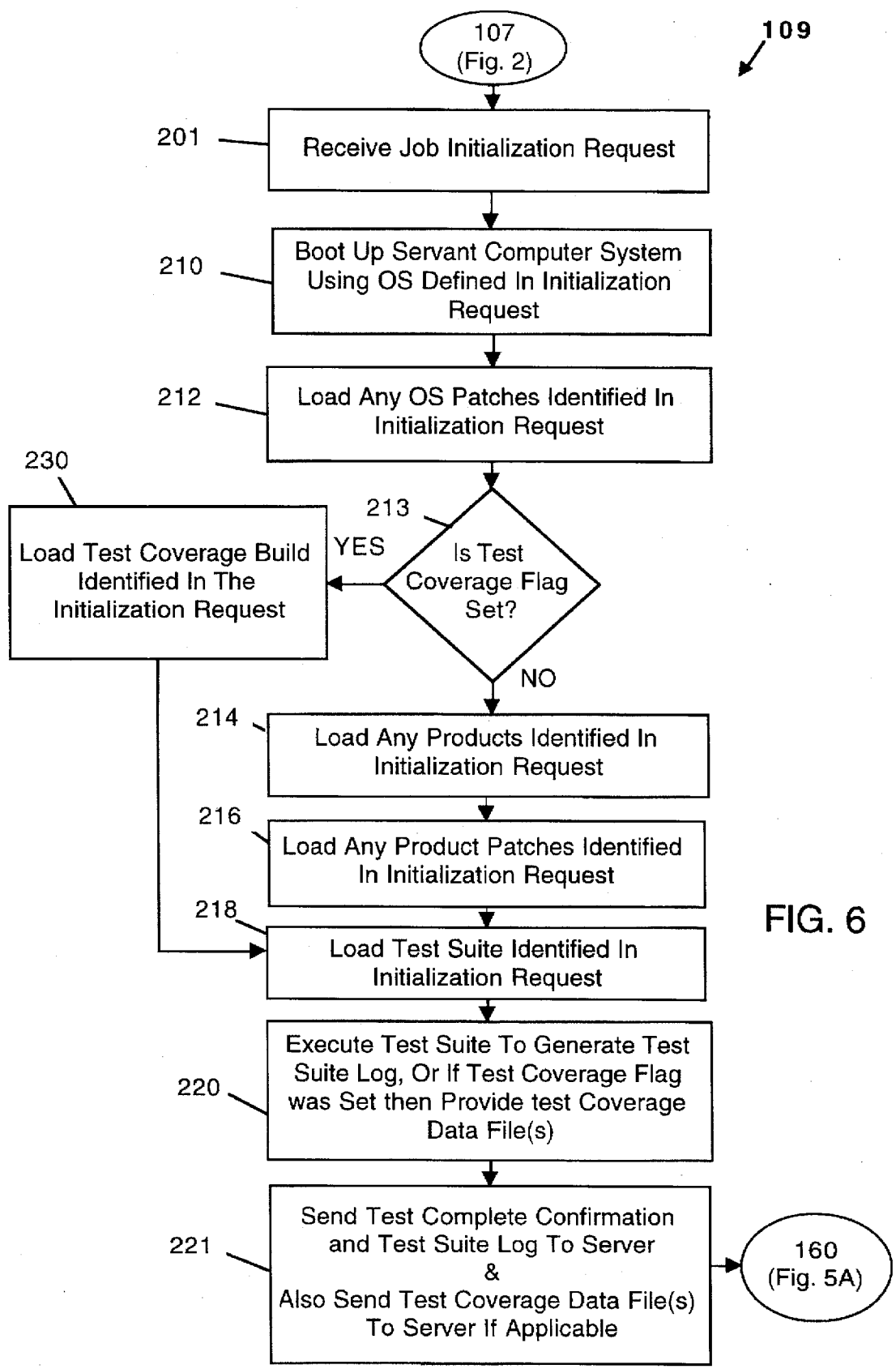
FIG. 6 illustrates process steps associated with executing the job on each servant computer system in accordance with one embodiment of the present invention.

FIG. 6 is a detailed illustration of step 159 of FIGS. 5A and 5B (or step 109 of FIG. 2), where a job is executed at a servant computer system. In step 201, the job initialization request is received from step 158 of FIG. 5A. As mentioned above, the job initialization request may contain all of the job defining parameters. By way of example, the initialization request may identify the software product being tested, whether there are any software product patches for testing, whether tests coverage testing is requested, etc.

The method then proceeds to step 210 where a servant computer system is booted up using any suitable operating system (i.e., software product) if an operating system was not specifically requested in the initialization request. However, if a specific operating system was defined in the initialization request, the servant computer system is booted up with the user-define operating system. Once the servant computer system is booted up with an operating system, the method proceeds to step 212 where user-defined operating system patches may be loaded onto the servant computer system (if any patches were defined in the initialization request).

The method then proceeds to step 213 where it is determined whether a test coverage flag is set as described in step 153 of FIG. 5A. If it is determined that the test coverage flag was set, the method proceeds to step 230 where test coverage build (i.e., compiled binary packets) identified in the initialization request is loaded onto the servant computer system. On the other hand, if the test coverage flag was not set in step 213, the method proceeds to step 214 where the software product targeted for is loaded onto the user-defined servant computer system. However, if no software product is identified for testing in the initialization request, then testing will be limited to testing the user-defined operating system. The method then proceeds to step 216 where any product patches identified in the initialization request are loaded for testing. It should be understood that the software product being loaded for testing on the servant computer systems have already been build into binary code (or was provided as binary code as described in FIG. 5A).

Once the proper software product has been loaded onto the user-defined servant computer system in either step 230 or steps 214 and 216, the method proceeds to step 218 where a test suite identified in the initialization request is loaded onto the servant computer system. As described above, the test suite is generally developed as unique sets of comprehensive data files having commands specifically programmed to initiate functional aspects of a software product being tested. Consequently, test suites are generally unique for each software product. As a result, executing a test suite facilitates the identification of particular aspects of the software product which may be evaluated for performance (i.e., pass or fail). From step 218, the method then proceeds to step 220 where the test suite loaded in step 218 is executed to generate a test suite log or a test coverage data file (if it was determined in step 213 that the test coverage flag was set).

Once the test suite log or test coverage data file is generated in step 220, the method proceeds to step 221 where a test complete confirmation and the test suite log generated in step 220 is sent to the server computer system. On the other hand, if the test coverage flag of step 213 was set, then a test complete confirmation and test coverage data file will be sent to the server computer system. At this point, the method reverts back to step 160 of FIG. 5B where the server receives a job complete confirmation and associated test suite log or test coverage data file for the particular servant computer system under test.

Figure 7:
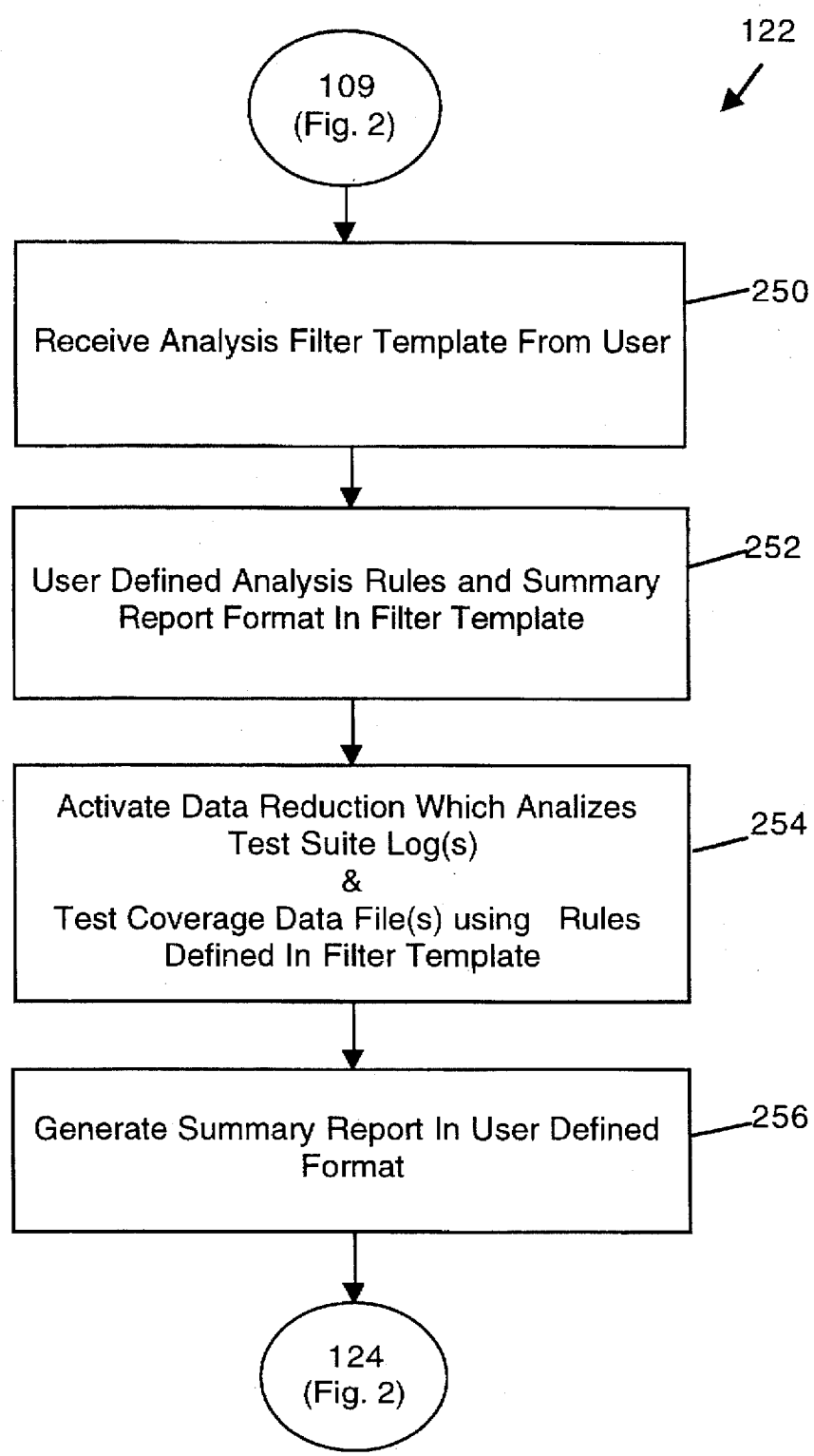
FIG. 7 shows, in one embodiment, the process steps associated with analyzing the test suite logs and test coverage data files in accordance with user provided definitions.

After all of the servant computer systems identified in the initialization request have completed executing for a particular job, the method proceeds to step 122 of FIG. 2. FIG. 7 is a detailed description of step 122 of FIG. 2. The method begins at step 250 where an analysis filter template is received from a user. The filter template gives the user an option to define what it means to pass or fail a particular test. This definition step further streamlines the testing process and eliminates the need to process the generated test data by additional test personnel. On the other hand, if the user failed to assign a meaning to the pass and fail states, the summary report will be presented to the user as simple pass and fail logs or data files.

From step 250, the method proceeds to step 252 where the user-defined analysis rules (if provided) and user-defined summary report format is received from the filter template. Once the user-defined analysis rules and summary report are received from the user, the server activates a data reduction in step 254 which analyzes and assigns to the generated test suite logs and test coverage data files a proper translation. The method then proceeds to step 256 where a properly translated summary report is generated in the user-defined format.

The summary report is then sent to the user-specified audience in step 124 of FIG. 2. As mentioned above, the user may identify any number of people or computer terminals as the recipient of the test summary report. By way of example, the test summary report may be sent to product managers, test engineers, company officials, etc. At this stage in the testing process, the software testing process is complete for the current job.

The present software testing invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention, these operations may be machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

In addition, the present invention further relates to computer readable media which include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 8:
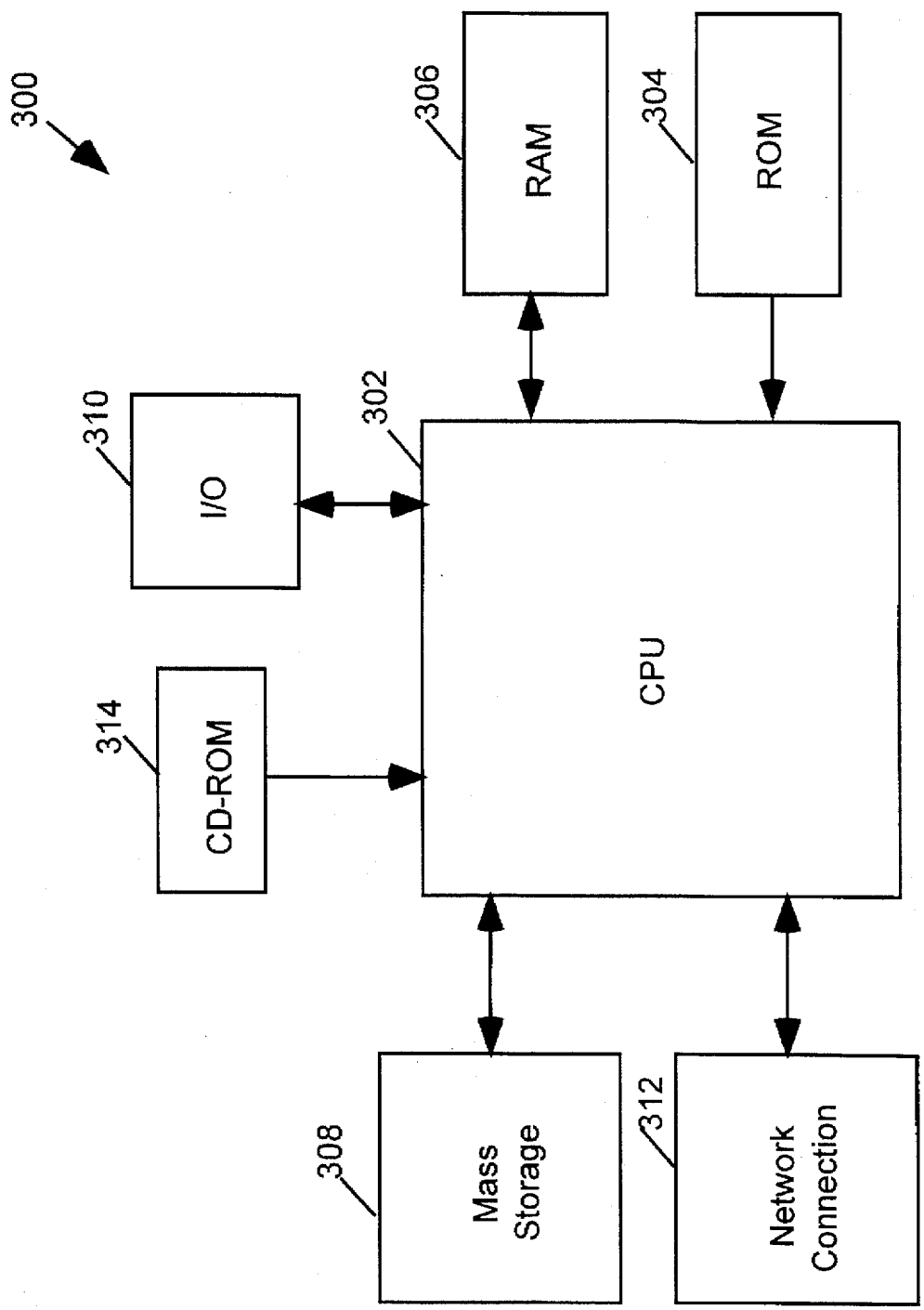
FIG. 8 shows a typical computer based system for use in accordance with one embodiment of the invention.

FIG. 8 at 300 shows a typical computer-based system in accordance with the present invention. Shown is a central processing unit 302 (CPU) which is coupled to memory devices including read only memory 304 (ROM) and random access memory 306 (RAM). As is well known in the art, ROM 304 acts to transfer data and instructions unidirectionally to the CPU and RAM 306 is used typically to transfer data and instructions in a bi-directional manner. A mass memory device 308 is also coupled bi-directionally to CPU 302 and provides additional data storage capacity. The mass memory device 308 may be used to store programs, data and the like and may take the form of a magnetic or paper tape reader or some other well-known device. It will be appreciated that the information retained within the mass memory device 308, may, in appropriate cases, be incorporated in standard fashion as part of RAM 306 as virtual memory. A specific mass storage device such as a CD-ROM 314 may also pass data uni-directionally to the CPU.

CPU 302 is also coupled to one or more input/output devices 310 which include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 302 optionally can be coupled to a computer or telecommunications network using a network connection as shown generally at 312. With such a network connection, it is contemplated that the CPU might receive information from the network, or might output information to the network in the course of performing the above-described method steps. The above-described devices and materials will be familiar to those of skill in the computer hardware and software arts.

Although the preferred embodiments of the present invention have been described in detail, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified in light of the full scope of equivalents of the appended claims.

What is claimed is:

1. A computer-implemented method for testing a software product through the use of a test suite designed to exercise the software product and generate a test suite log indicative of test results obtained from executing the test suite, the method being performed through the use of a server computer system and a plurality of servant computer systems, the method comprising the steps of:

transmitting the software product and the test suite to each of a plurality of selected ones of the plurality of servant computer systems and loading the software product and test suite on each of the selected servant computer systems;

executing the software product and test suite on each of the plurality of selected servant computer systems, wherein the execution of the test suite on each of the selected servant computer system causes the generation of a test suite log on each of the selected servant computer systems; and transmitting the test suite logs generated by each of the selected servant computer systems to the server computer system.

2. A computer-implemented method as recited in claim 1, wherein the software product transmitted to each of a plurality of selected ones of the plurality of servant computer systems is built on a product build computer system that is networked with the server computer system.

3. A computer-implemented method as recited in claim 1, further comprising the step of displaying a test summary report in a predefined format, the test summary report being constructed at least in part by reference to the test suite logs received by the server computer system.

4. A computer-implemented method as recited in claim 3, wherein the test summary report is displayed on a remote computer system that is networked to the server computer system.

5. The computer-implemented method for testing software as recited in claim 1, further comprising the steps of:

determining whether a test coverage flag is set; and when it is determined that the test coverage flag is set, transmitting a test coverage build to the plurality of servant computer systems such that each servant computer system executes the test coverage build and generates a test coverage data file that is transmitted back to the server computer.

6. The computer-implemented method for testing software as recited in claim 5, wherein the step of spawning a test coverage build is performed on a product build computer system that is networked to the server computer system.

7. The computer-implemented method for testing software of claim 5, wherein the software product to be tested is an operating system.

8. The computer-implemented method for testing software of claim 5, wherein the software product to be tested is an application program.

9. The computer-implemented method for testing software as recited in claim 5, wherein the software product to be tested is a service.

10. A method as recited in claim 5 wherein each time the software product and the test suite are transmitted to a particular one of the selected servant computer systems, the method further comprising the step of:

determining whether a software product patch is required to execute the test suite on the particular servant computer system; and loading the software product patch onto the particular servant computer system when it is determined that the software product patch is required for executing the test suite.

11. A computer-implemented method for testing a software product on a servant computer system, the method comprising the steps of:

receiving an initialization request from a remotely located server computer system, the job initialization request identifying the software product to be tested and a test suite;

loading the software product and test suite identified in the job initialization request, the test suite being arranged to exercise the software product and generate a test suite log indicative of test results obtained from exercising the software product;

executing the identified test suite whereby a test suite log indicative of test results is generated; and transmitting the test suite log to the server computer system.

12. The computer-implemented method for testing a software product on a servant computer system as recited in claim 11, further comprising the steps of:

determining whether a test coverage flag is set; and when it is determined that the test coverage flag is set, loading a test coverage build identified in the initialization request onto the servant computer system such that the servant computer system executes the test coverage build and generates a test coverage data file that is then transmitted to the server computer system.

13. The computer-implemented method for testing a software product on a servant computer system as recited in claim 11, further comprising the steps of:

determining whether the initialization request identifies a software product patch and when it is determined that the initialization request identifies a software product patch, loading the identified software product patch.

14. The computer-implemented method for testing a software product on a servant computer system as recited in claim 11, wherein the product to be tested is an operating system.

15. The computer-implemented method for testing a software product on a servant computer system as recited in claim 14, wherein the operating system is identified in the job initialization request and is used to boot up the servant computer system.

16. The computer-implemented method for testing a software product on a servant computer system as recited in claim 11, wherein the product to be tested is an application program.

17. The computer-implemented method for testing a software product on a servant computer system as recited in claim 11, wherein the product to be tested is a service.

18. A computer-implemented method for coordinating the testing of a software product, the method comprising the steps of:

receiving a test configuration matrix that designates a job identifying a software product to be tested, a plurality of servant computer systems having different hardware configurations for testing the software product, and a test suite designed to exercise the software product, and the servant computer systems being networked to the server computer system;

determining whether each of the servant computer systems is available for testing, and when it is determined that a particular servant computer system is available, scheduling the job on the available servant computer system;

transmitting the software product and test suite to selected ones of the servant computer systems identified in the configuration matrix when they are available, and directing the selected servant computer systems to execute the test suite such that a test suite log is generated at each of the selected servant computer systems, the test suite logs being indicative of test results obtained from executing the test suite; and receiving the test suite logs from the selected servant computer systems.

19. A computer-implemented method as recited in claim 18, further comprising the steps of:

determining whether a test coverage flag in the test configuration matrix is set for the designated job;

when it is determined that the test coverage flag is set, directing the spawning of a test coverage build to create the software product and transmitting the resulting product build to the selected servant computer systems, wherein the test suite logs generated by the selected servant computer systems each take the form of a test coverage data file.

20. A computer-implemented method as recited in claim 19, further comprising the step of displaying a test summary report in a predefined format, the test summary report being constructed at least in part by reference to the test suite logs received from the server computer system.

21. A computer-implemented method as recited in claim 18, wherein the software product is built on a product build computer system that is networked with the server computer system.

22. A computer-implemented method as recited in claim 18, wherein the software product is one selected from the group consisting of an operating system, an application program, and a service.

23. A computer program product comprising a computer-usable medium having computer-readable code embodied thereon for testing a software product on a servant computer system, the computer program product comprising the following computer-readable program code for effecting actions in the computer:

program code for receiving an initialization request from a remotely located server computer system, the job initialization request identifying the software product to be tested and a test suite;

program code for loading the software product and test suite identified in the job initialization request, the test suite being arranged to exercise the software product and generate a test suite log indicative of test results obtained from exercising the software product; and program code for executing the identified test suite whereby a test suite log indicative of test results is generated and then transmitted to the server computer system.

24. The computer program product for testing a software product on a servant computer system as recited in claim 23, the computer program product further comprising the following computer-readable program code for effecting actions in the computer:

program code for determining whether a test coverage flag is set; and when the program code determines that the test coverage flag is set, loading a test coverage build identified in the initialization request onto the servant computer system such that the servant computer system executes the test coverage build and generates a test coverage data file that is then transmitted to the server computer system.

25. A computer program product comprising a computer-usable medium having computer-readable code embodied thereon for coordinating the testing of a software product, the computer program product comprising:

program code for receiving a test configuration matrix that designates a job identifying a software product to be tested, a plurality of servant computer systems having different hardware configurations for testing the software product, and a test suite designed to exercise the software product;

program code for determining whether each of the servant computer systems is available for testing, and when it is determined that a particular servant computer system is available, scheduling the job on the available servant computer system;

program code for transmitting the software product and test suite to selected ones of the servant computer systems identified in the configuration matrix when they are available, and directing the selected servant computer systems to execute the test suite such that a test suite log is generated at each of the selected servant computer systems, the test suite logs being indicative of test results obtained from executing the test suite; and program code for receiving the test suite logs from the selected servant computer systems.

26. The computer product as recited in claim 25, further comprising the following computer-readable program code for effecting actions in the computer:

program code for determining whether a test coverage flag in the test configuration matrix is set for the designated job;

program code for directing the spawning of a test coverage build to create the software product and transmitting the resulting product build to the selected servant computer systems, when the program code determines that the test coverage flag is set, wherein the test suite logs generated by the selected servant computer systems each take the form of a test coverage data file.

27. An automated system for testing software, the system comprising:

a server computer system;

a plurality of servant computer systems defining a plurality of different hardware configurations, the plurality of servant computer systems being networked to the server computer system;

a test software product;

a test suite designed to exercise the test software product on selected ones of the plurality of servant computer systems, the test suite being arranged to create a test suite log indicative of test results obtained from exercising the test software product;

a dispatcher associated with the server computer system for transmitting the test software product and the test suite to the selected servant computer systems; and wherein each servant computer system includes a mechanism configured to execute the test suite to generate the test suite log and a mechanism configured to transmit the test suite log generated thereon to the server computer system.

28. An automated system for testing software as recited in claim 27 further comprising a test matrix arranged to identify the test software product, the test suite and the servant computer systems that the test software product is to be tested on.

29. An automated system for testing software as recited in claim 28 further comprising:

a mechanism configured to determine whether a test coverage flag is set in the test matrix and when it is determined that the test coverage flag is set, transmitting the test software product to the plurality of servant computer systems such that each servant computer system executes the test software product and generates a test coverage data file that is transmitted to the server computer.

30. In a computer based software testing configuration that includes a server computer system, a plurality of servant computer systems defining a plurality of different hardware configurations, the plurality of servant computer systems being networked to the server computer system, a test software product to be tested and a test suite designed to exercise the test software product on selected ones of the plurality of servant computer systems, the test suite being arranged to create a test suite log indicative of test results is obtained from exercising the software product, an automated system comprising:

a dispatcher associated with the server computer system for transmitting the test software product and the test suite to the selected servant computer systems; and wherein at least one servant computer system includes a mechanism configured to execute the test suite to generate the test suite logs and a mechanism configured to transmit the test suite log generated thereon to the server computer system.

31. A method for testing a software product through the use of a test suite designed to exercise the software product and generate a test suite log indicative of test results obtained from executing the test suite, the method comprising:

arranging a server computer system to be networked to a plurality of servant computer systems;

transmitting a test coverage build defining selected portions of the software product identified for special consideration and the test suite to the plurality of servant computer systems, and loading the test coverage build and test suite on each of the selected servant computer systems when a test coverage flag is set;

executing the test coverage build and test suite on each of the plurality of selected servant computer systems, wherein the execution of the test suite on each of the selected servant computer systems causes the generation of a test coverage data file on each of the selected servant computer systems; and transmitting the test coverage data file generated by each of the selected servant computer systems to the server computer system.

32. In a software testing system that includes a server computer system, a plurality of servant computer systems being networked to the server computer system, a test software product to be tested and a test suite designed to exercise the test software product on selected ones of the plurality of servant computer systems, the test suite being arranged to create a test suite log indicative of test results is obtained from exercising the software product, an automated system comprising:

a dispatcher associated with the server computer system for transmitting the test software product and the test suite to the selected servant computer systems, the dispatcher having a queuing mechanism for holding testing jobs until the selected computer systems having a particular computer configuration is available; and wherein at least one servant computer system includes a mechanism configured to execute the test suite to generate the test suite logs and a mechanism configured to transmit the test suite log generated thereon to the server computer system.

* * * * *